April 11, 1961 W. L. BURHANS 2,978,814
PRECISION HOLE CENTERING AND MARKING DEVICE
Filed Dec. 4, 1959 2 Sheets-Sheet 1
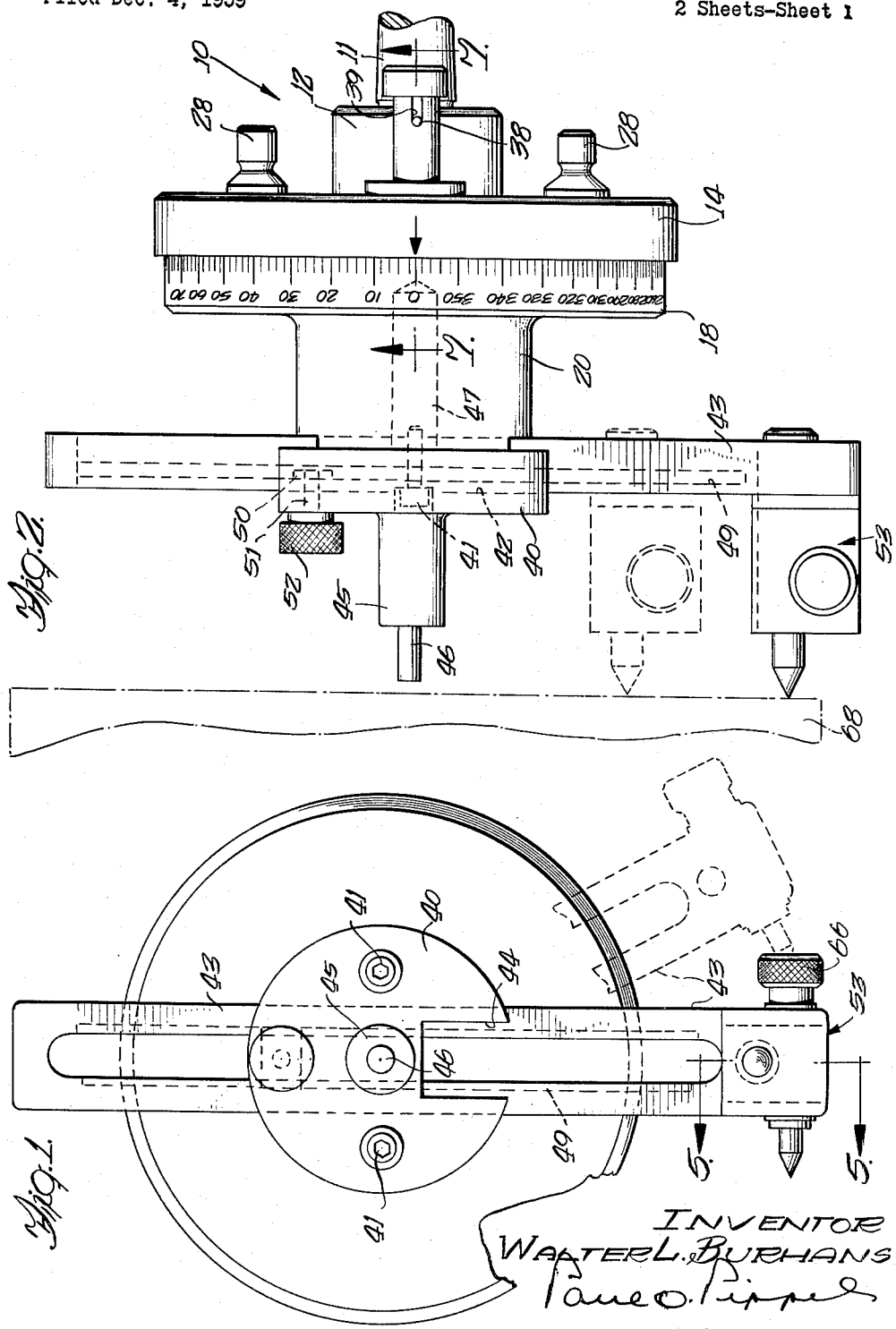

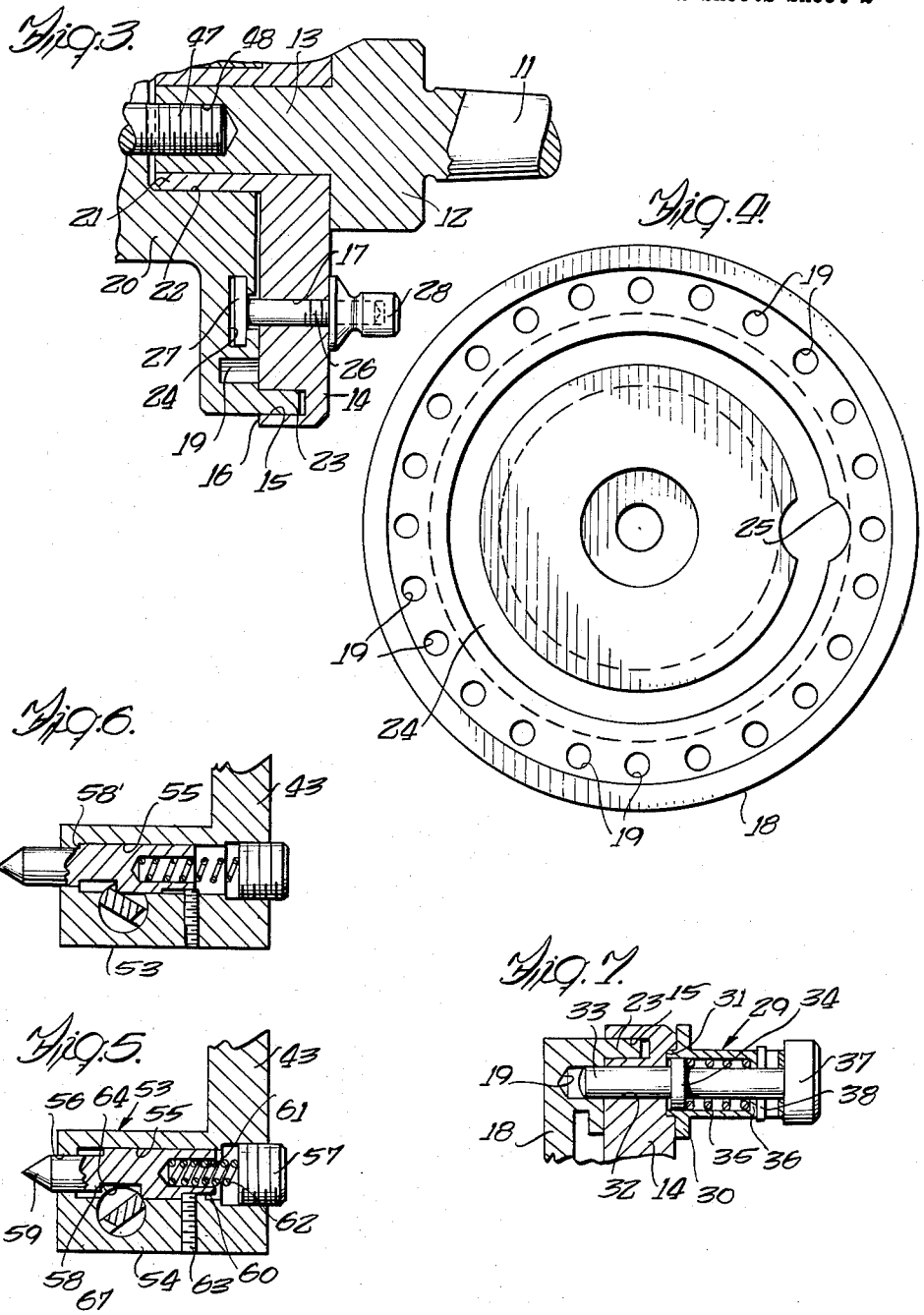

United States Patent Office 2,978,814
Patented Apr. 11, 1961

2,978,814
PRECISION HOLE CENTERING AND MARKING DEVICE

Walter L. Burhans, 305 E. 136th Place, Chicago 27, Ill.

Filed Dec. 4, 1959, Ser. No. 857,401

3 Claims. (Cl. 33—189)

This invention relates to a hole locating and marking device for marking hole centers in a work piece supported within a machine tool. More specifically the invention relates to a precision centering unit particularly adapted for a lathe and used in connection with the locating of hole centers in a work piece.

In many instances it is desired to locate a number of holes in a work piece, the said work piece being supported in a chuck of a lathe and where the holes are to be drilled in either the lathe operation or in a subsequent drilling operation. In instances where it is desired to locate a plurality of holes in a circumferentially spaced position on a work piece, the locating of the said holes is a time consuming, and in many instances an inaccurate operation. It is a prime object of this invention to provide an improved precision center and hole locating device including a suitable marking member adapted to suitably indent the work piece and to accurately locate a plurality of holes which may be provided on the work piece in circumferentially spaced relation.

It is another object of the invention to provide an improved hole locating and marking device adapted to be quickly inserted in the stationary portion of a machine tool, the said device being readily adapted for locating and marking, by indentation, a work piece carried in the rotatable portion of the machine tool.

A still further object of the invention is to provide a hole locating device particularly adapted for insertion into the stationary portion of a lathe, the said device including rotatable members having suitable indicia marking in degrees whereby one rotatable member may be locked in a plurality of positions, the said rotatable member including adjustable means having a marking device carried thereon and being operable to actuate a centering plunger means for marking a work piece rotatably carried by the chuck of the lathe.

These and other objects of the invention will become more readily apparent from a reading of the description when taken in connection with the accompanying sheets of drawings.

In the drawings:

Figure 1 is a front view, in elevation, of a locating and centering device for locating holes;

Figure 2 is a side elevational view of the locating and centering device shown in Figure 1;

Figure 3 is an enlarged cross sectional view through a portion of a centering device showing a locking pin arrangement;

Figure 4 is a detail view of a rotatable member showing in elevation the circumferentially spaced openings provided in an internal face of said member;

Figure 5 is an enlarged cross-sectional view taken substantially along the line 5—5 of Figure 2;

Figure 6 is a view similar to Figure 5 showing an operating position of a centering punch means; and Figure 7 is a cross-sectional view of a stop taken along the line 7—7 of Figure 2.

Referring to the drawings a hole locating and marking or centering device is generally indicated by the reference character 10. The device 10 comprises a taper shank 11 adapted to fit into the female portion of a tail stock of a lathe (not shown). The taper shank 11 is provided with an annular enlargement 12 having an extension 13. A non-rotatable cylindrical plate or disk is indicated at 14. The disk 14 includes a circumferentially extending guide slot 15 provided in a front face 16 on the member 14. As best shown in Figure 3 the disk 14 includes an axially extending bore 17 on one side of the extension 13 and another similar bore (not shown) is provided on the disk 14 on the other side of the extension 13 in diametrically opposed relation.

A second cylindrical member or rotatable disk is indicated at 18. The inner face of the disk 18 is best shown in Figure 4. The said disk includes a plurality of axially extending circumferentially spaced holes designated at 19. Twenty four of these holes are provided, or in other words, the holes are spaced in clockwise relation each hole being 15° apart from the adjacent holes. The member 18 includes a hub portion 20 adapted to rotate about a bearing sleeve 21 provided on the member 14. The hub portion 20 is provided with an inner bearing face 22 which engages the bearing 21 in relative rotating relation. The member 18 is provided with a skirt 23 extending peripherally and being guided within the circumferential guide slot 15. The rotatable disk 18 is also provided with an annular T-slot 24, which as indicated in Figure 4 has an enlarged opening 25. As best shown in Figure 3 each of the bores 17, only one of which is shown, includes a threaded pin 26 having an enlarged head 27 which is guided in the T-slot 24. Each pin 26 is further provided with a threaded knob 28 and upon tightening of the knobs the heads 27 tightly engage within the T-slot 24 to prevent rotation of the member 18. The enlarged openings 25 provide for the insertion of the heads 27 during assembly of the parts 18 with the member 14.

As best shown in Figures 2 and 7 the device 10 is also provided with a releasable stop 29 consisting of a housing 30 which is secured within a recess 31 provided in the member 14. The member 14 is also provided with a bore 32 and has positioned for reciprocation therein a plunger 33 having an enlarged head 34 which is normally engaged by a spring 35 to urge the said plunger 33 into engagement with one of the bores or holes 19. The housing 30 is provided with an end wall 36 against which the spring 35 reacts. The plunger is also provided with a head 37 and a pin 38 extends transversely through the plunger 33, and in the position shown in Figure 7 is positioned within opposed slots 39 provided in the housing 30. When the plunger 33 is in the position shown in Figure 7 the member 18 is secured against rotation and in order to release the said member 18 the plunger 33 is retracted and the pin 38 is positioned out of engagement with the slots whereupon the said plunger 33 is retained out of blocking position.

As best shown in Figures 1 and 2 the device 10 further includes a disk 40 which is rigidly secured to the hub 20 by means of cap screws 41. The disk 40 includes a transversely extending slot 42 within which is slidingly carried, an arm 43. The disk 40 is provided with a cutout indicated at 44. A boss 45 on the disk 40 is coaxial with the member 18, 14 and taper shank 11. A locating pin 46 also is coaxial with the boss 45. The disk 40 also includes a threaded rod 47 which as indicated in Figure 3 engages a threaded bore 48 on the extension 13 in securing relation. The member 18 and disk 40 are rotatable in unitary relation. The arm 43 is also provided with an elongated T-slot in which a slidable plate 50 is disposed. A screw 51 is threaded through within the disk 40 and is in threaded engagement with the plate 50 whereupon tightening of the screw 51 by means of a knob 52 the plate 50 may be secured within the T-slot 49 to prevent sliding movement of the arm 43 relative to the disk 40.

As best shown in Figures 1, 2, 5 and 6 a marking or indentation device is indicated at 53. The device 53 consists of a housing 54 rigidly secured to the arm 43. The housing further includes a bore 55 opening outwardly as indicated at 56. An adjustable screw 57 is adjustable within the housing 54 and is concentric with a plunger 58 disposed within the bore 55. The plunger 58 includes a pointed end 59 and is also provided with a slot 60. A concentric bore 61 is provided on the plunger 58, the said bore 61 housing a spring 62 which reacts against the screw 57. The spring normally urges the plunger 58 to the position shown in Figure 6 whereupon shoulders 58' engage a portion of the housing 54 to stop forward movement of the said plunger 58. A guide screw 63 is threaded upwardly in the housing 54 and engages the slot 60 to prevent rotation of the plunger 58. The plunger 58 is also provided with a transverse undercut 64 which communicates with a transverse bore 65 in the housing 54. A knob 66 is provided with a cam 67 which is rotatable within the transverse bore 65 and which in the position shown in Figure 5 reacts against the plunger to restrain the reaction of the spring 62 thus keeping the plunger in a retracted position. As shown in Figures 2, 5 and 6 a work piece 68 is positioned adjacent the plunger point 59.

The device 10 may be utilized in connection with any machine tool wherein a chuck holds a work piece and rotates the same and where a stationary member is provided which will support the device 10. The device is particularly adapted for utilization with a lathe having a suitable chuck co-axial with a suitable non-rotating tail piece within which the taper shank 11 is supported to secure the device in position. Supposing now the operator wishes to locate a number of holes on a certain radius and at a suitable spacing in degrees he thereupon adjusts the arm 43 laterally until a suitable radius, as measured between the locating pin 46 and pointed end 59, is reached upon which he tightens the knob 52 and the arm is held against further transverse movement. If the holes are to be located in varying degrees he may utilize the indicia marking shown in Figure 2 and sets the proper degree in aligning relation with respect to the arrow of the member 14 and thereupon tightens one or both of the knobs 28 which retains the rotatable member 18 and arm 43 against further rotation and in the position desired. At this point the plunger 59 is in the position shown in Figure 5 and by slightly rotating the knob 66 and cams 67 to the position shown in Figure 6 the plunger 58 shoots forwardly by means of the spring 62 whereupon the pointed end 59 indents the work piece to provide a suitable marking. The operator then again unlooses the knobs 28 and moves the member 18 and arm 43 so that the other desired degree marking is in line with the arrow of the member 14 whereupon the next mark or indentation may be made.

If a number of holes of equal degree spacing are to be marked the bores 19 are utilized. For instance if as many holes as the number of bores 19 are to be marked the operator merely moves the plunger 33 into engagement with each hole 19, releases the plunger 58, makes the mark, and retracts the plunger 33 whereupon the member 18 is moved to the next position. Since the holes 19 are 15 degrees apart any number of spacing degrees divided by 15 can, of course, be made by the utilization of the said holes 19 and plunger 33. Thus the work piece is quickly marked with respect to the holes to be drilled.

It is also contemplated in the present invention that the marking device may be utilized in connection with a suitable motor which may force the plunger 58 into engagement with the work piece. It is also contemplated that the plunger may be utilized in connection with a rotatable drill suitably driven by a motor which will provide the marking or which will actually drill a pilot or other hole as desired.

Thus it is obvious that the objects of the invention have been fully achieved and it must be understood that changes and modifications may be made which do not depart from the spirit of the invention as disclosed or from the scope thereof as defined in the appended claims.

What is claimed is:

1. A locating device for a machine tool having a holding member including a bore, and a rotatable work holder spaced longitudinally and concentrically along the axis of said holding member, said work holder being adapted to rotate a work piece carried thereon; comprising a first non-rotatable cylindrical member, a shank on said first non-rotatable member and adapted to be held in non-rotating engagement within the bore of said holding member, a second rotatable cylindrical member rotatably connected to said first member, said second member having an inner face including a plurality of circumferentially uniformly spaced bores opening in the direction of said first member, an annular T-slot in said face opening in the direction of said first member, said second member having an outer periphery including indicia from 0 degrees to 360 degrees, indicating indicia on said first member adapted to coordinate with first mentioned indicia, means on said first member engageable with said T-slot for releasably securing said second member against rotation, a releasable member on said first member movable into and out of engagement with said bores to lock said second member against rotation, an arm slidably supported on said second member and being rotatable therewith, said arm being adapted to move transversely with respect to the axis of rotation of said second member, releasable means for locking said arm in position relative to said second member, and marking means on said arm, said marking means including a spring actuated pointed element releasable into engagement with the work piece to mark the same.

2. A locating device for a machine tool having a holding member including a bore, and a rotatable work holder spaced longitudinally and concentrically along the axis of said holding member, said work holder being adapted to rotate a work piece carried thereon; comprising a first non-rotatable cylindrical member, a shank on said first non-rotatable member engaging said bore of said holding member in non-rotating relation, a second rotatable cylindrical member rotatably connected to said first member, said second member having an inner face including a plurality of circumferentially uniformly spaced bores opening in the direction of said first member, releasable locking means on said first member engaging said bores, said second member having an outer periphery including indicia representing degrees, indicating indicia on said first member adapted to coordinate with first mentioned indicia, an arm slidably supported on said second member and being rotatable therewith, said arm being adapted to move transversely with respect to the axis of rotation of said second member, releasable means for locking said arm in position relative to said second member, marking means on said arm, said marking means including a pointed element and self contained actuating means supported on said arm adapted to engage said marking means whereby the same is movable into engagement with the work piece to mark the same.

3. A locating device for a machine tool having a holding member including a bore, and a rotatable work holder spaced longitudinally and concentrically along the axis of said holding member, said work holder being adapted to rotate a work piece carried thereon; comprising a first non-rotatable cylindrical member, a shank on said first non-rotatable member engaging said bore of said holding member in non-rotating relation, a second rotatable cylindrical member rotatably connected to said first member, said second member having an inner face, an annular T-slot in said face opening in the direction of said first member, said second member having an outer periphery including indicia, indicating indicia on said first member adapted to coordinate with first mentioned indicia, means on said first member engageable with said T-slot for securing said second member against rotation, an arm slidably supported on said second member and being rotatable therewith, said arm being adapted to move transversely with respect to the axis of rotation of said second member, releasable means for locking said arm in position relative to said second member, and marking means on said arm, said marking means including a pointed element movable into engagement with the work piece to mark the same.

References Cited in the file of this patent

UNITED STATES PATENTS

| | | |
|---|---|---|
| 1,671,341 | Brown | May 29, 1928 |
| 2,569,349 | Smith | Sept. 25, 1951 |
| 2,671,274 | Greenberger | Mar. 9, 1954 |